(12) United States Patent  
Patwardhan et al.

(10) Patent No.: US 10,747,447 B1
(45) Date of Patent: Aug. 18, 2020

(54) STORING DE-DUPLICATED DATA WITH MINIMAL REFERENCE COUNTS

(71) Applicant: EMC Corporation, Hopkinton, MA (US)

(72) Inventors: Kedar Patwardhan, Irvine, CA (US); Anand Ghatnekar, Pune (IN)

(73) Assignee: EMC IP HOLDING LLC, Hopkinton, MA (US)

( * ) Notice: Subject to any disclaimer, the term of this patent is extended or adjusted under 35 U.S.C. 154(b) by 728 days.

(21) Appl. No.: 14/871,213

(22) Filed: Sep. 30, 2015

(51) Int. Cl.
*G06F 3/06* (2006.01)

(52) U.S. Cl.
CPC ............ *G06F 3/0619* (2013.01); *G06F 3/065* (2013.01); *G06F 3/0608* (2013.01); *G06F 3/0641* (2013.01); *G06F 3/0683* (2013.01)

(58) Field of Classification Search
CPC .... G06F 3/0619; G06F 3/0683; G06F 3/0641; G06F 3/0608; G06F 3/065
See application file for complete search history.

(56) References Cited

U.S. PATENT DOCUMENTS

| 8,166,261 | B1* | 4/2012 | Cremelie | G06F 17/30097 707/692 |
| 8,214,428 | B1* | 7/2012 | Christiaens | G06F 11/1464 707/610 |
| 8,620,962 | B1* | 12/2013 | Strunk | G06F 3/0619 707/797 |
| 8,914,324 | B1* | 12/2014 | Guo | G06F 16/1748 707/640 |
| 2012/0185447 | A1* | 7/2012 | Zhang | G06F 17/30156 707/693 |
| 2014/0258370 | A1* | 9/2014 | Bares | G06F 17/30159 709/203 |

\* cited by examiner

*Primary Examiner* — Michael Krofcheck
(74) *Attorney, Agent, or Firm* — Workman Nydegger

(57) ABSTRACT

Systems and methods for adding backups to de-duplicated storage and for removing backups from de-duplicated storage are disclosed. Backups can be added to the de-duplicated storage with minimal reference count updates. Backup data sets can be removed without garbage collection processes being performed on the de-duplicated storage.

15 Claims, 5 Drawing Sheets

| Backup 1 | 202 |
|---|---|
| Blocks | 204 |
| 1 | Identifier |
| 2 | Identifier |
| 3 | Identifier |
| 4 | Identifier |

| Reference | 206a |
|---|---|
| Identifier | Count |
| 1 | 1 |
| 2 | 1 |
| 3 | 1 |
| 4 | 1 |

| Backup 2 | 208 |
|---|---|
| Blocks | 210 |
| 1 - 1 | Identifier |
| 2 | Identifier |
| 3 | Identifier |
| 4 | Identifier |

| Reference | 206b |
|---|---|
| Identifier | Count |
| 1 | 1 |
| 1 - 1 | 1 |
| 2 | 1 |
| 3 | 1 |
| 4 | 1 |

| Reference | 212 |
|---|---|
| Count | Count |
| 1 | 1 |
| 1 - 1 | 1 |
| 2 | 2 |
| 3 | 2 |
| 4 | 2 |

STORING DE-DUPLICATED DATA WITH MINIMAL REFERENCE COUNTS

FIELD OF THE INVENTION

Embodiments of the invention relate to systems and methods for protecting data or data sets. Embodiments of the invention further relate to systems and methods for storing de-duplicated data or data sets in storage with minimal reference counting.

BACKGROUND

One of the most important aspects of computing systems is the data. As a result, many data owners ensure that their data is protected. This is achieved by regularly backing up the data. As backup technology continues to advance, backup data sets and backup applications become more sophisticated. For example, many backup sets allow the data to be restored at different points in time. This allows a data owner to understand what the data looked like at different dates.

Another benefit of backup technology is the ability to de-duplicate the backup data sets. An initial benefit of de-duplication is that the storage requirements are reduced. However, de-duplicated data sets introduce new problems that need to be solved.

Conventional approaches to de-duplication illustrate some of the problems associated with de-duplicated data sets. Data in de-duplicated data sets are typically broken into chunks and each chuck is associated with a reference count and a fingerprint (e.g., a hash of the chunk) that uniquely identifies the chunk. The reference count of a data chunk generally identifies how many backups are associated with that data chunk. As backups are added or removed from the backup data sets, the reference count is increased or decreased.

When the reference count of a data chunk is reaches zero, the data chunk and the fingerprint can be removed from the backup data sets. Because data chunks and their fingerprints are removed from the backup data sets, the need to trawl the backup data sets to identify chunks that are not part of any backups (e.g., perform garbage collection) is significantly reduced.

The requirement to maintain reference counts in convention de-duplication systems, however, introduces processes that can take a significant amount of time and that can be extremely slow. For example, the amount of data that changes from one backup to the next is usually a small percentage. Consequently, many backups often share much of the same data. The benefit of de-duplication is that only the changed data in the data set, which is usually a small percentage of the entire data set, needs to be backed up. The drawback of this system is that all of the reference counts (e.g., of all of the chunks or blocks in the backup data sets) need to be updated for each backup and/or each backup removal. When the backup data set is relatively small, this is not a large problem. When a backup data set includes millions or tens of millions of data chunks, the process of increasing or decreasing reference counts for millions of data chunks can take a very long time and can consume significant computing resources.

In another type of de-duplicated storage, reference counts are simply not maintained. In this example, the fingerprints of the chunks may be used to determine whether a data chunk is already present in the backup data sets, but there is no need to update any reference count. The problem with this system is that garbage collection is required to identify and remove data chunks that are not referenced by any backup.

The garbage collection process iterates through all manifest files (potentially thousands of manifest files) in the storage. Each manifest file is associated with a backup data set and each manifest file lists the data chunks associated with that backup data set. Be processing all of the manifest files, the garbage collection process identifies and lists all data chunks referred to in each of the manifest files. Subsequently, all data chunks (often numbering in millions) that exist in the storage are identified and listed. The garbage collection process then removes all manifest files that refer to a data chunk(s) that is not present in storage in one example. In addition, all data chunks that are not referred to by any of the manifest files are removed from the de-duplicated storage. This type of de-duplicated storage system can be very fast when storing or removing a backup from storage. However, the garbage collection process can take several hours or days to perform.

Systems and methods are needed that can reduce that can reduce the time and computing resources associated with maintaining references counts and/or performing garbage collection.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 2 illustrates an example of backup data sets and their associated metadata including reference counts;

DETAILED DESCRIPTION OF SOME EXAMPLE EMBODIMENTS

Figure 1:
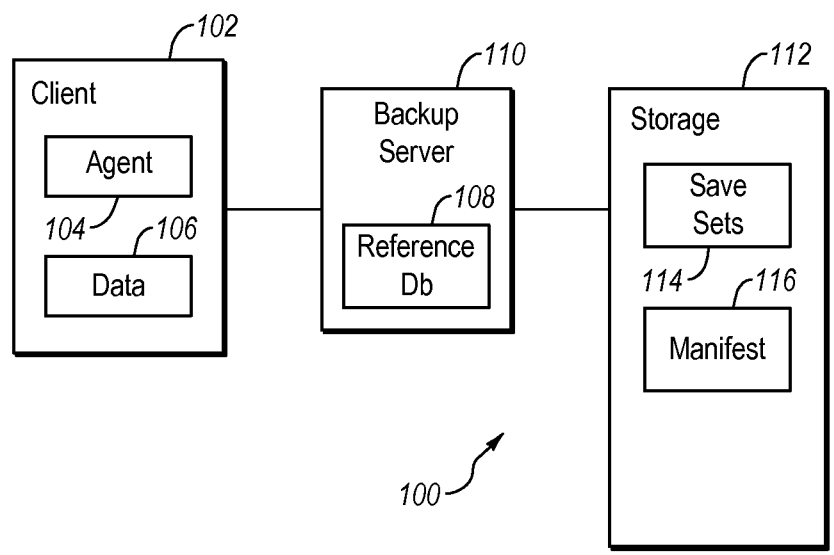
FIG. 1 illustrates an example of a system for generating de-duplicated backup sets using minimal reference counts.

Embodiments of the invention relate to systems and methods for protecting data. Embodiments of the invention relate to adding backup data sets to storage and/or to removing backup data sets from storage. Backups may be referred to herein as backups or backup data sets or the like. The backup data sets are stored in de-duplicated storage (e.g., a data center or other system or device that includes storage devices). Embodiments of the invention relate to systems and methods for storing de-duplicated chunks (or blocks) of data without requiring reference counts for at least some of the de-duplicated blocks to be updated. Embodiments of the invention do not require garbage collection even after an arbitrary removal of a backup data set from the backup storage. Embodiments of the invention further relate to cloud-based de-duplicated backups. However, the de-duplicated backups can be stored in any other storage device or system whether local to a computing system or whether remote from the computing system.

In one example, a de-duplicating backup application or system chunks the data to be backed up into chunks or blocks. This can include dividing the data into chunks, which may be of the same size. The chunks are fingerprinted (e.g., hashed) to obtain the fingerprints of the chunks. The fingerprints may be further encrypted in one example. Once the data set to be backed up (or the changed data relative to a previous backup data set) is chunked and fingerprinted, a data chunk and the corresponding fingerprint are stored on the de-duplicating storage system only if the fingerprint is unique and not already present on the storage system.

Each backup data set is associated with a manifest file in the de-duplicated storage. The manifest file identifies the fingerprints of the data chunks that are included in or associated with that backup data set. The fingerprints may be listed in order of their occurrence in the backup. As a result, restoring a backup from the de-duplicated storage includes reading the manifest file corresponding to the backup to be restored and retrieving data chunks as identified by their fingerprints (listed in the manifest file) from the de-duplicated storage. The data chunks are then combined together in the order as mentioned in the manifest file to reconstruct the backup image. To fully restore data, more than one backup data set may be required because some of the backup data sets may be incremental backup data sets.

Embodiments of the invention allows backup data sets to be added to or removed from the de-duplicated storage without having to update reference counts for most of the de-duplicated chunks and without requiring garbage collection to remove unreferenced chunks or data objects.

Generally, the process for adding a backup data set to a storage (e.g., a de-duplicated cloud based storage) includes chunking the backup data into data chunks, fingerprinting the chunks, and creating a manifest file to list all the chunks of the backup in their order of appearance. When the backup is an incremental backup, the manifest file may only identify the chunks that have changed since a previous backup operation.

For each chunk in the backup data set, the de-duplicated storage (or a local database) is queried to determine whether the chunk as identified by its fingerprint was a part of the previous 'n' backups stored in the de-duplicated storage. Often, the previous 'n' backups are older backup images or data sets of the same source data set (older images or data sets from the same backup chain). The value of "n" may be 1 or greater. If the fingerprint was referred to in the manifest file of any of the previous 'n' backups, the chunk does not need to be added to the de-duplicated storage and there is no need to update a reference count associated with the chunk.

If the fingerprint was not referred to in any of the manifest files of the previous 'n' backups, a check is made to ensure that a chunk with the same fingerprint is not already present in the de-duplicated storage. If the fingerprint is not present in de-duplicated storage, the chunk is added to the de-duplicated storage and a reference count of the fingerprint set to 1. If the fingerprint was already present in de-duplicated storage, the reference count on the fingerprint is incremented. As a result, there may be instances when the reference count of a given fingerprint is greater than 1. Generally, the number of reference counts that are updated when adding a backup to the de-duplicated storage is minimized.

This process is repeated for all chunks of the backup data set to be stored in de-duplicated storage. After all of the chunks have been processed, the backup is complete and the manifest of the backup may be stored in the de-duplicated storage. The manifest may also have been previously stored in the de-duplicated storage during the backup operation.

When removing a backup data set from the de-duplicated storage, the manifest file for the backup data set to be removed is read and a list of fingerprints that make up the backup data set is obtained. A process is then performed for each of the fingerprints in order to remove the backup from the de-duplicated storage. For example, a check is made to determine if the fingerprint is present in the previous 'n' backups or in the subsequent 'm' backups of the backup chain. This is done, in one example, by comparing the fingerprint with the fingerprints in the manifest files of the 'n' previous backups and the 'm' subsequent backups. In one example, n=m.

If the fingerprint was not present in any of the 'n' previous or 'm' subsequent backups, the fingerprint and associated chunk is a candidate for removal. Otherwise, nothing more needs to be done for the concerned fingerprint and the next fingerprint can be considered.

If a candidate fingerprint for removal is identified, the reference count of that fingerprint is decremented. If the reference count drops to zero, the fingerprint and the corresponding data chunk are removed from the de-duplicated storage.

Embodiments of the invention do not require garbage collection to remove unreferenced data chunks after the removal of a backup. In addition, embodiments of the invention do not require manipulating reference counts for each and every data chunk of a backup that is added to or removed from the de-duplicated storage. Embodiments of the invention are fast and efficient. Because subsequent backups of a data source may share around 90% (by way of example and not limitation) of data with the previous backup and even more so with previous 'n' backups, the need to increment reference count on a data chunk can drop to as low as 1% or 0.1% (by way of example and not limitation) of the total data chunks constituting a backup. This speeds up the backup process dramatically compared to systems that update reference counts for each chunk and also reduces the amount of metadata changes generated on the de-duplicated storage corresponding to increased reference counts on data objects. Removing a backup is also fast because reference counts on data objects only rarely need to be decremented. Further, garbage collection is never required to remove orphaned chunks or data objects in some embodiments.

FIG. 1 illustrates an example of a system for generating de-duplicated backup sets using minimal reference counts. FIG. 1 illustrates a computing system 100. The computing system may include computers and other devices that may communicate over a local area network, the Internet or the like. The computers typically include at least one processor, memory of one or more types, and other hardware. The computing system 100 that includes a backup server 110 and a client 102 that is associated with data 106. The backup server 110 may be a hardware computing device that includes a backup application operating thereon. The client 102 may be a server (e.g., email server, file server, database) or the like and the data 106 represents, by way of example only and not limitation, data objects, files, emails, database data, or the like. The computing system 100 may include multiple clients that are backed up by the backup server 110.

The backup server 110 may store the backup save sets 114 in storage 112. The storage 112 may be cloud-based storage (e.g., a datacenter that includes a plurality of storage devices that is accessible over the Internet or other network connection) or a local storage device or device array.

When a backup save set of the data 106 is generated or made, the backup save set is stored in or added to the save sets 114 of the storage 112. The save sets 114 are de-duplicated in one example. As a result, portions of the backup save set that are already stored in the save sets 114 do not need to be added to the save sets 114. In one example, the manifest file of the backup data set being added to the save sets 114 will reference already existing chunks in the save sets 114.

The save sets 114 are associated with manifests 116. In one example, each backup save set is associated with a specific manifest. The manifest 116 of a particular backup includes a list of fingerprints that identify chunks in the save sets 114 that correspond to the particular backup. This allows the data for a particular backup to be extracted from the save sets 114 during a restore operation using the fingerprints to identify and/or locate the data chunks.

The backup server 110 may cooperate with an agent 104 to perform a backup operation. In one example, the agent 104 may reside on the client 102 and communicates with the backup server 108. However, the data 106 can be protected without an agent in one example or with an agent operating on another client or on the backup server 110. When performing the backup operation, a reference database 108 may be used when reference counting to the extent reference counting is performed.

The reference database 108 may reside on or be accessible to the backup server 110 and/or the agent 104 or other component of the backup application. The reference database 108 may also reside on the client 102 or in the storage 112 or the like. The reference database 108 can be used when backup data sets are added to and removed from the storage 112. The reference database 108 may associate specific chunks included in the save sets 114 with a reference count that can be incremented or decremented as discussed below.

FIG. 2 illustrates an example of backup data sets and their associated metadata including reference counts. FIG. 2 illustrates an example of changing reference counts when adding a backup to storage. As previously stated, it may not be necessary to update all of the reference counts. More specifically, significantly less than all of the reference counts are updated in some embodiments.

For example, in addition to data, a backup 202 is associated with a manifest 204 and with a reference database 206a. The manifest 204 may include a list of blocks or data chunks that are a part of the backup 202 and an identifier (e.g., a fingerprint) for each of the blocks or chunks. In another example, the manifest 204 may include a list of identifiers or fingerprints. The fingerprints themselves identify the blocks and may be used to locate the chunks in the de-duplicated storage 112.

When the backup operation generating the backup 202 is performed, the reference database 206a may be consulted to determine if any of the blocks 204 are included in or referenced in the reference database 206a. In this example, none of the blocks 204 were referenced in the reference database 206a prior to the backup operation. As a result, the fingerprints of the chunks or blocks were added to the reference database 206a and the reference counts were incremented for each of the identifiers. Thus, these blocks now have a reference count of 1 because they were just added to the reference database. The reference database 206a may, of course, include multiple entries in addition to those illustrated.

In one example, the backups illustrated in FIG. 2 are associated with the same source data set. Thus, only some of the data changes from one backup to the next. FIG. 2 illustrates another backup 208, which was performed subsequent to the backup 202. In this example, some of the blocks or chunks 210 associated with the backup 208 are the same as those associated with the backup 202 and some are different. In particular, the backup 208 includes the chunk or block 1-1. Stated differently, the block 1 in the backup 202 may have changed and now has a different identifier or fingerprint that was not previously present in the reference database.

This change is reflected in the reference database 206b—shown after completing the backup 208. The reference database 206b is simply the reference database 206a at a later point in time.

In this example, the identifier of the chunk 1-1 was not included in the reference database 206a. The identifier of the chunk or block 1-1 is then added to the reference database 206b and the reference count is increased to 1. Because the chunks 2-4 of the backup 208 were already included in the reference database 206a, there is no need to change the reference counts in the reference database 206b. Further, only the block 1-1 is added to the de-duplicated storage because the other chunks are already stored in the de-duplicated storage.

In contrast, the reference database 212 illustrates a conventional way of tracking data chunks in a de-duplicated storage. Adding the backup 208 in a conventional system requires all of the reference counts for the chunks 210 to be updated. Thus, the reference count for chunk 1-1 is incremented to 1 while the reference counts for chunks 2-4 is increase to 2.

As the amount of chunks in a backup increases, it is clear that a conventional update can take significantly longer because all reference counts for blocks or chunks in the backup may need to be updated. A backup that includes millions of chunks requires significant time to update reference counts. In contrast, reference database 206b illustrates that a much lower number of reference counts may be changed for any particular backup.

When a backup is added to the storage, the backup is typically the most recent backup. As a result, fingerprints from previous backups are considered when changing the reference counts or when deciding which chunks or blocks are not duplicates and are added to the save sets in the storage. The removal of a backup however, is usually different and can be arbitrary. In other words, any backup in a string of backups can be removed. As a result, 'n' previous backups and 'm' subsequent backups may be considered when adjusting reference counts.

Figure 3:
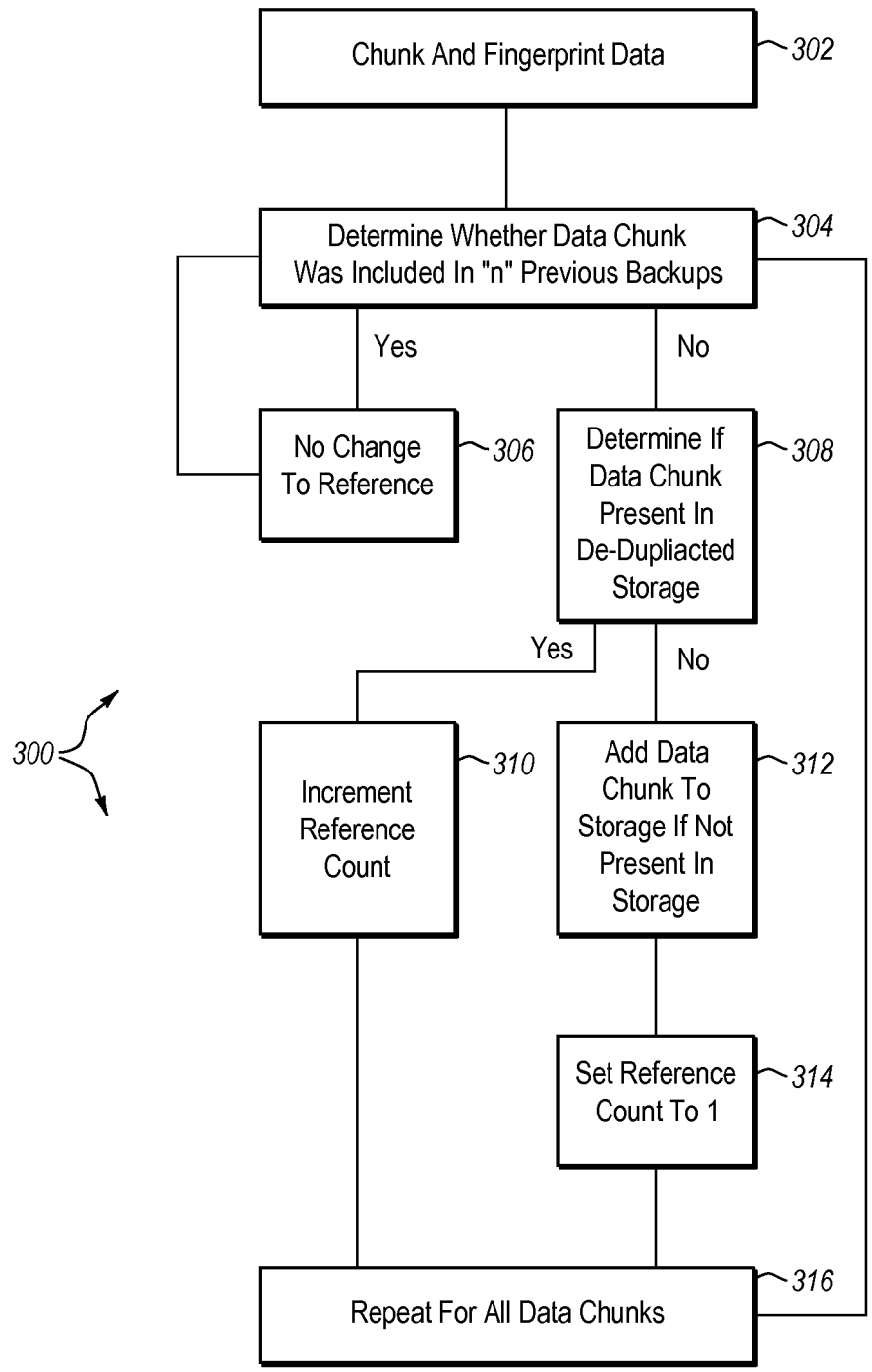
FIG. 3 illustrates an example of a method for adding a backup data set to de-duplicated storage.

FIG. 3 illustrates an example of a method 300 for adding a backup data set to storage. The method 300 may begin after a backup operation is initiated. As previously discussed, at least some of the data may be chunked and fingerprinted in box 302. Once the data is chunked and fingerprinted, each chunk and associated fingerprint can be processed. In one example, it may only be necessary to chunk and fingerprint data that has changed since the most recent backup operation.

In box 304, a determination is made as to whether a particular chunk was included in 'n' previous backups. This may include comparing the fingerprint of the chunk to the reference database or to one or more manifests in the storage. For example, the fingerprint of the chunk 1-1 in FIG. 2 may be compared to the identifiers in the reference database 206a in FIG. 2.

If the chunk was included in one of the 'n' previous backups, then there is no change to the reference count in box 306 and the method proceeds to the next chunk. For example, the identifier of the chunk 2 of the backup 208 is present in the previous backup as shown in the reference database 206a. Thus, no change is made to the reference count of the fingerprint of the chunk 2 in the reference database 206b.

If the chunk is not present in the previous 'n' backups in box 304, then the method 300 determines if the chunk is present in the de-duplicated storage. This may be performed by comparing the identifier or fingerprint of the chunk with identifiers or fingerprints maintained by the de-duplicated storage in one example.

If the chunk is already present in the de-duplicated storage, then the reference count of the chunk is incremented in box 310. This is an example of a time when the reference count may increase to 2 or higher. If the chunk is not present in the de-duplicated storage in box 308, then the chunk is added to the de-duplicated storage in box 312, the identifier is added to the reference database and the reference count for the chunk is set to 1 in box 314. In box 316, the method proceeds to the next chunk until all the chunks are processed.

Figure 4:
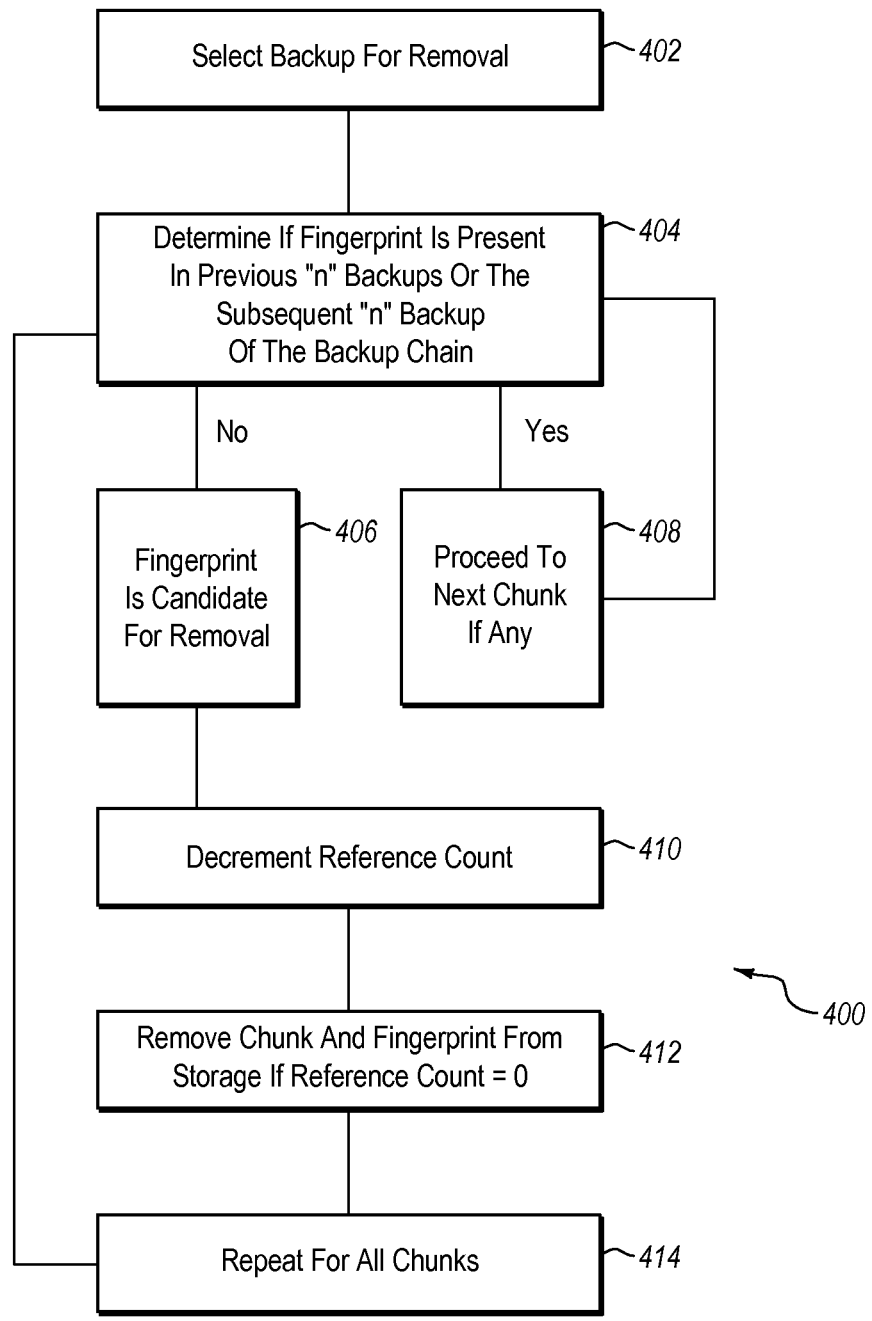
FIG. 4 illustrates an example of a method for removing a backup data set from de-duplicated storage.

FIG. 4 illustrates an example of a method 400 for removing a backup data set from storage. When removing a backup from storage, the backup to be removed is selected in box 402. This may include selecting a specific backup or backups from a list of backups for example. In another example, certain backups may be removed in a predetermined manner or according to a schedule.

After the backup for removal is selected, each of the chunks for the selected backup are processed as shown by box 414. Initially, the chunks of the selected backup data set to be removed can be identified from the manifest of the selected backup. The manifest of the selected backup data set identifies all chunks associated with the backup.

Figure 5:
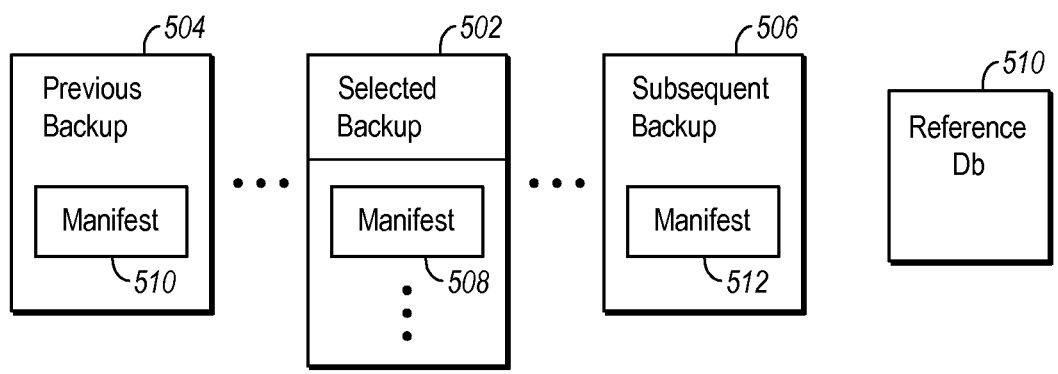
FIG. 5 further illustrates an example of removing a backup from de-duplicated storage.

For example, a fingerprint of a chunk is compared with the manifests of 'n' previous backups (if any) and 'm' subsequent backups (if any). FIG. 5, for example, illustrates a selected backup 502 and a manifest of the backup 502 that includes a list of fingerprints 508. The finger print 508 is compared with the fingerprints in the manifest 510 of 'n' previous backups and with the fingerprints in the manifest 512 of the 'm' subsequent backups 506.

If the finger print 508 is not found in the manifests 510 and 512, then the chunk associated with the fingerprint 508 is a candidate for removal in box 406. If the fingerprint is found in at least one of the manifests 510 and 512, then the method 400 can proceed to the next chunk in box 408 and no further action need be taken with respect to that chunk.

If a chunk is a candidate for removal, then the reference count of the chunk is decremented in the reference database in box 410. With reference to FIG. 5, the reference count associated with a chunk that is a candidate for removal is decremented in the reference database 510.

If the reference count is zero after being decremented, then the chunk and associated fingerprint are removed from the de-duplicated storage in box 412. If the reference count is not zero, then there is at least one backup that references the chunk in the de-duplicated storage. This method ensures that chunks whose reference count becomes 0 are removed at the time the backup is removed. As a result, there is no longer a need to perform garbage collection to remove unreferenced chunks after removing the backup because the chunk has already been removed in conjunction with removing the selected backup.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention.

Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. The backup application that is used to backup data and add/remove backups from de-duplicated storage may include one or more components or modules such as the agent. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation to backup data of a client, wherein backups of the data are stored in a data set, the method comprising:
    adding a new backup to the data set
    determining whether a chunk of the new backup is included in one or more previous backups associated with the client-;
    determining if the chunk is present in de-duplicated storage when the chunk is not present in the one or more previous backups;
    adding the chunk to the de-duplicated storage when the chunk is not present in the de-duplicated storage and not present in the one or more previous backups and setting a reference count associated with the chunk to one; and
    incrementing a reference count associated with the chunk in a reference database that stores reference counts of chunks stored in the de-duplicated storage when the chunk is not present in the one or more previous backups and is present in the de-duplicated storage, wherein none of the reference counts, including the reference count associated with the chunk, are incremented or processed when the chunk is present in the one or more previous backups, wherein the reference database associates reference counts with fingerprints of chunks.

2. The method of claim 1, further comprising dividing at least a portion of the new backup into chunks.

3. The method of claim 2, further comprising determining a fingerprint for each of the chunks.

4. The method of claim 1, wherein determining whether a chunk of the new backup was included in one or more previous backups comprises determining if a fingerprint of the chunk is included in the reference database.

5. The method of claim 1, further comprising performing, for each chunk in the new backup:
    determining whether the chunk was included in one or more previous backups;
    determining if the chunk is present in de-duplicated storage;
    adding the chunk to the de-duplicated storage when the chunk of data is not present in the de-duplicated storage; and
    incrementing a reference count associated with the chunk when the chunk is present in the de-duplicated storage or added to the de-duplicated storage.

6. The method of claim 1, further comprising generating a manifest for the new backup.

7. The method of claim 1, further comprising storing the reference database at the client or at a backup server.

8. The method of claim 7, wherein the de-duplicated storage comprises cloud storage.

9. A method for storing a backup data set in a de-duplicated storage, wherein the de-duplicated storage stores previous backups, the method comprising:
    adding the backup data set to the previous backups by preparing the backup data set by dividing at least a portion of the backup data set into chunks of data and determining a fingerprint for each of the chunks;
    for each chunk of data to be backed up:
    referencing a reference database associated with the backups to determine whether a chunk of the data set to be backed up is included in the previous backups based on a fingerprint of the chunk, the reference database storing reference counts for the chunks;
    when the chunk is not included in the previous backups, determining if the chunk of the data set is present in the de-duplicated storage, wherein the chunk of the data set is added to the de-duplicated storage if the chunk is not included in the de-duplicated storage a reference count for the chunk is set to one; and
    increasing the reference count when the chunk of data is not included in the previous backups but is included in the de-duplicated storage, wherein none of the reference counts including the reference count associated with the chunk, are increased or processed when the chunk of data is included in the previous backups.

10. The method of claim 9, further comprising increasing the reference count to 1 when the chunk of the data is not already included in the de-duplicated storage.

11. The method of claim 9, further comprising determining whether a chunk of the data is included in the previous backups by comparing the fingerprint with fingerprints of the chunks associated with the previous backups.

12. The method of claim 9, further comprising generating a manifest for the backup data set, wherein the manifest includes fingerprints of each chunk in the backup data set, wherein the fingerprints are arranged in an order of occurrence.

13. The method of claim 9, wherein the fingerprint and the reference count associated with the fingerprint are stored in the reference database that is stored at a client or at a backup server or at the de-duplicated storage.

14. The method of claim 9, further comprising incrementing less than all of the reference counts associated with the chunks of the data, wherein the reference counts are stored in the reference database stored on a client or a backup server, wherein the reference database is associated with multiple backups.

15. The method of claim 9, wherein the previous backups includes one or more backups.

* * * * *